Figure 1:
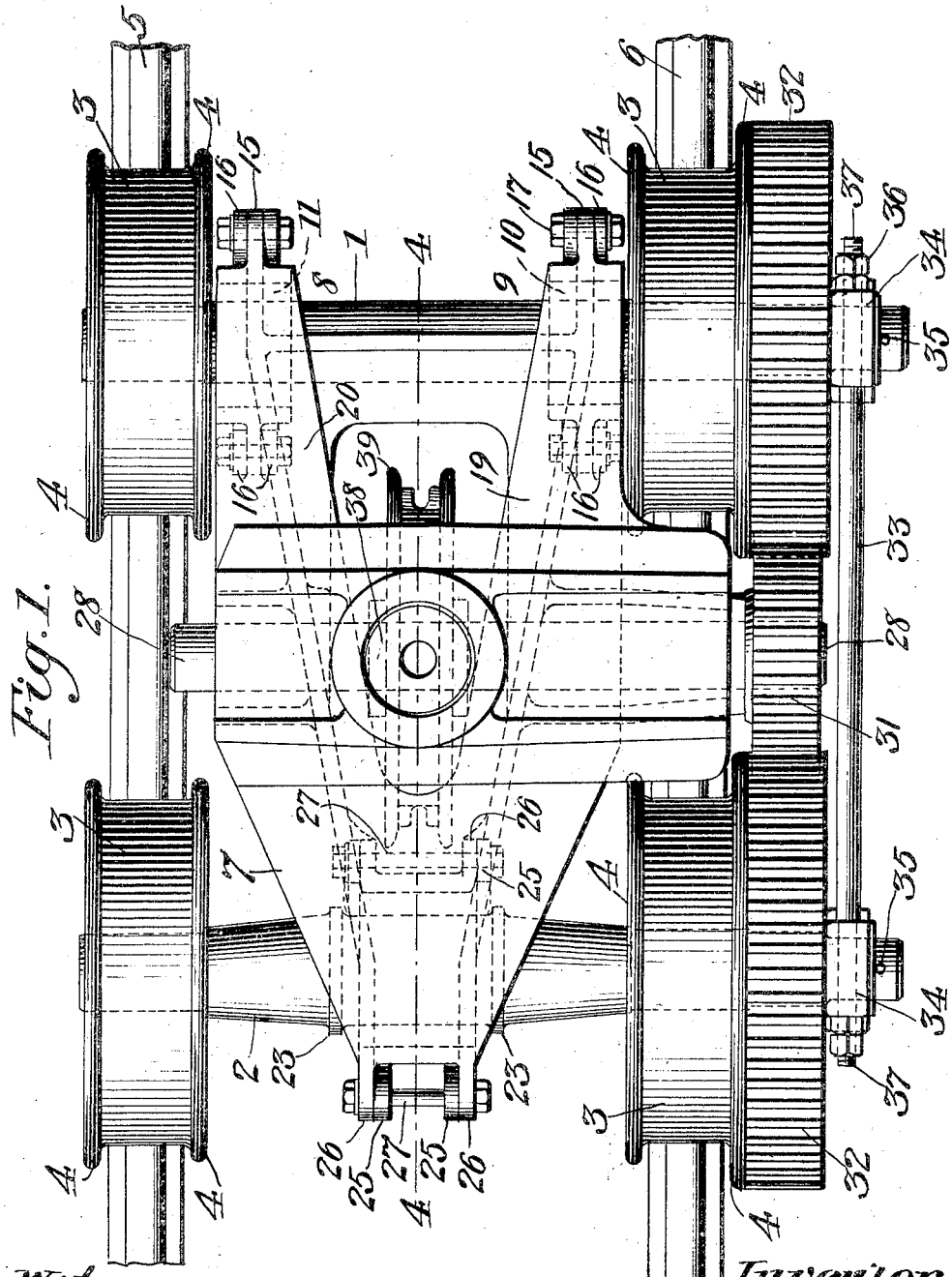

W. FERRIS.
COMPENSATING TRUCK.
APPLICATION FILED FEB. 17, 1913.

1,075,096.

Patented Oct. 7, 1913.
3 SHEETS—SHEET 1.

Witnesses.
Inventor.
Walter Ferris

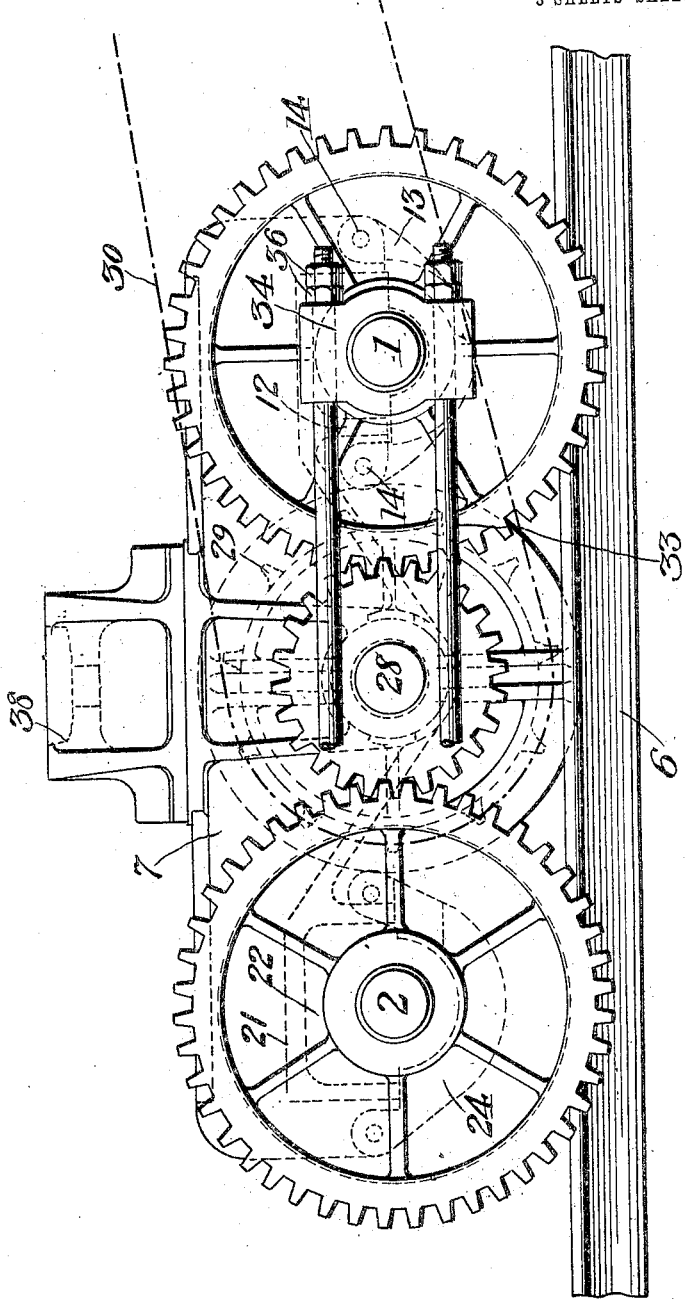

W. FERRIS.
COMPENSATING TRUCK.
APPLICATION FILED FEB. 17, 1913.
1,075,096.
Patented Oct. 7, 1913.
3 SHEETS—SHEET 3.
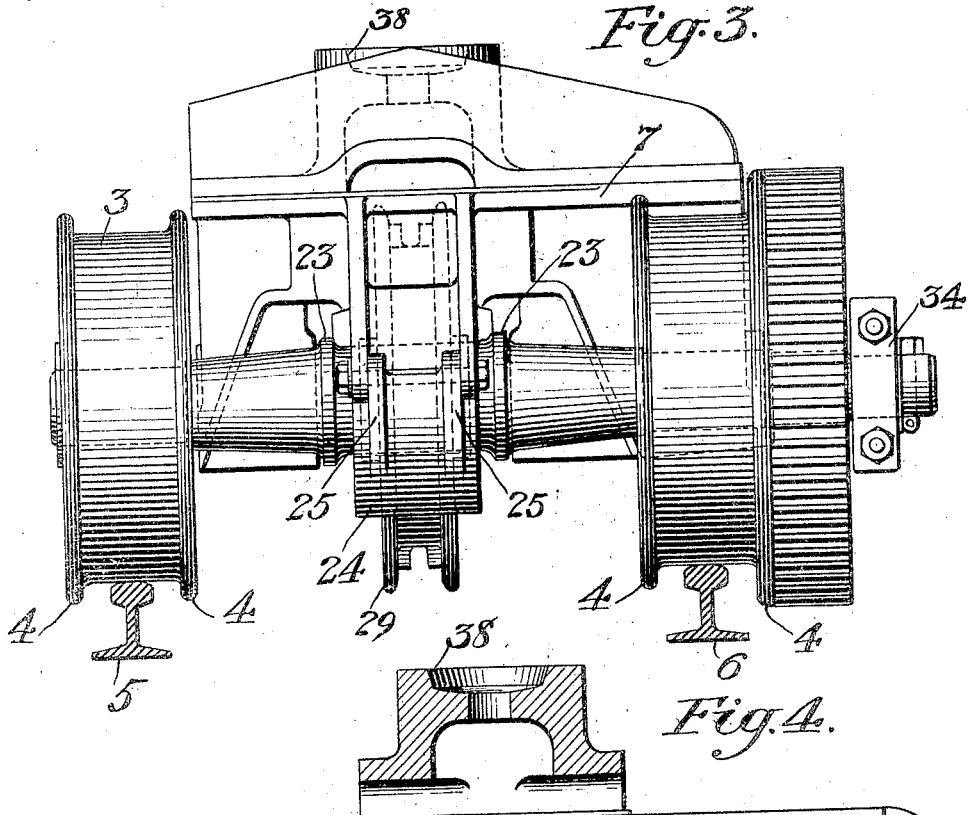
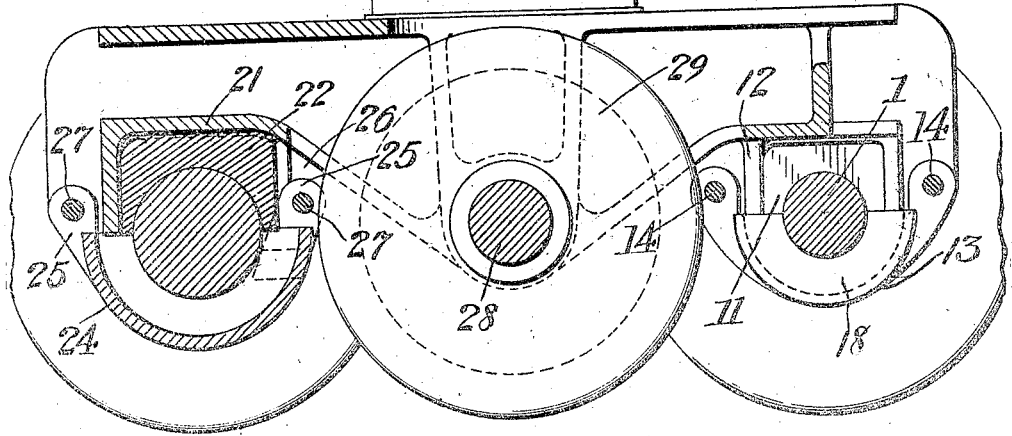

UNITED STATES PATENT OFFICE.

WALTER FERRIS, OF MILWAUKEE, WISCONSIN.

COMPENSATING-TRUCK.

1,075,096. Specification of Letters Patent. Patented Oct. 7, 1913.

Application filed February 17, 1913. Serial No. 748,947.

*To all whom it may concern:*

Be it known that I, WALTER FERRIS, a citizen of the United States, residing at Milwaukee, in the county of Milwaukee and State of Wisconsin, have invented certain new and useful Improvements in Compensating-Trucks; and I do hereby declare the following to be a full, clear, and exact description of the invention, such as will enable others skilled in the art to which it appertains to make and use the same.

This invention relates to supporting trucks which are used in conjunction with large portable pieces of machinery to support and propel the same on a suitable trackway.

Heretofore pile drivers, derricks, steam shovels and the like have usually been supported on two trucks which were provided with certain compensating means for effecting an equal distribution of the load on the four wheels of each truck. It has been found advantageous in the case of the larger machines to use four trucks instead of two, and to provide a four rail trackway upon which said trucks are propelled. It is apparent that when four trucks are used the problem of equalizing the load becomes more complicated. The present invention aims to provide a truck whose novel construction thoroughly adapts it to such a use. A co-pending application, Ser. No. 748,936, filed Feb. 17, 1913, discloses the use of the improved truck in combination with a portable steam shovel.

In furtherance of this main object and other objects which will appear as the specification proceeds, the invention consists in mounting a suitable supporting framework on the two axles of the truck, in such manner that each of the said axles can move out of the horizontal plane of the two axles. The supporting framework is adapted to support its share of the machine at a suitable center bearing. The whole truck is therefore capable of a bodily movement out of the horizontal plane without imparting such movement to the machine which it supports. As the four wheels of each truck are not compelled to remain in the same horizontal plane, it is obvious that inequalities of the track will not tend to throw the weight on two wheels of each truck, as would be the case if the four wheels had to move in unison. The load is therefore equally distributed to the four wheels of each truck. A novel form of driving means to propel the truck is used in furtherance of certain other objects of the invention. When the machine body is mounted on the four trucks in the manner set forth in the co-pending application referred to, the load is efficiently distributed to the four trucks.

In the more detailed description of the invention which is to follow, reference is made to the accompanying drawings, but it will be understood that only one form of the invention is illustrated therein and various changes and modifications can be made without departing from the spirit or scope of the invention, as defined in the claims.

In the drawings:—Figure 1 is a top plan view of a truck constructed according to the invention. Fig. 2 is a side elevation showing the manner of transmitting motion to the truck wheels. Fig. 3 is an end view of the improved truck, and Fig. 4 is a sectional view taken on line 4—4 of Fig. 1.

Throughout these several views, like reference characters refer to corresponding parts.

The front and rear axles of the truck are designated by the reference numerals 1 and 2, respectively, on which are forced or keyed the wheels 3, preferably having flanges on each side of the wheel as shown at 4 to guide the same along a suitable trackway, two rails of which are represented by the numerals 5 and 6. Said rails 5 and 6 constitute one side of the trackway, the other side consisting of similarly positioned rails upon which the opposite truck runs.

Supported by the two axles 1 and 2 is a suitable framework or supporting member 7 mounted upon said axles at three points as follows:—The front of the frame 7 is mounted on the axle 1, at two points 8 and 9. Suitable bearing blocks 10 and 11 engage the axle at these points. They are preferably made of cast iron with a lining of Babbit metal where the bearing block engages the axle. These blocks fit in boxes 12 preferably cast integral with the frame 7, as clearly shown in Figs. 2 and 4. To clamp the frame down upon the axle and to secure the bearing blocks 10 and 11 in place, bearing caps 13 are provided which encircle the under side of the axle and are secured to the frame 7 by suitable means such as bolts 14. The bearing caps 13 have bifurcated extremities into which fit suitable web portions 15 cast integrally with the framework 7. The arms 16 of each bifurcated extremity of the bearing caps are secured to the said web portions 15 by means of the bolts 14 and the nuts 17. Preferably, the bearing caps 13 are made hollow or semi-annular in shape, so that the web portions 18 will engage the ends of the bearing blocks and the central hollow portion will serve as receptacles for retaining a packing or a body of waste and oil to feed the bearing surface of the block 11 with lubricant. As the frame 7 is supported at only two points on the front axle, it is unnecessary to make the front of said framework of solid construction. For this reason, the frame at the front portion preferably consists of two diverging arm portions 19 and 20, as clearly shown in Fig. 1, the bearing blocks 10 and 11 being carried by the boxes on the said diverging arms 19 and 20 respectively.

The rear portion of the framework 7 preferably converges toward a point at which it is supported on the rear axle 2. The framework at this point carries a box 21 similar to the boxes 12, which engage the front bearing blocks. Fitted in said box 21 is a bearing block 22 similar to the bearing blocks hereinbefore described. The rear axle 2 is preferably constructed of a slightly larger diameter than the front axle and is provided with the circular flanges 23 to prevent lateral movement of the frame 7. A bearing cap 24 of similar construction to the ones hereinbefore described is used to clamp the rear of the framework down upon the rear axle thereby holding the bearing blocks in position. Said cap 24 is made semi-annular in shape and is provided with the web portions 25 adapted to be closely positioned to the web portions 26 of the framework to allow for the insertion of suitable securing bolts 27. In order to permit the rear axle to tilt transversely of the track, the top surface of the bearing block 22 is slightly rounded. The framework which rests upon said rounded surface is therefore free to rock upon the same or conversely, the bearing block which must necessarily tilt with the rear axle can rock relatively to the framework 7. From this construction, it is obvious that the front and rear axle need not always remain in the same horizontal plane and, consequently, the wheels carried by said axles are free to move out of their horizontal plane. Inequalities of the track will, therefore, not tend to throw the load on two wheels of each truck, as would be the case if the axles were carried in such relation to the frame that the tilting would have to be done in unison.

The preferred form of driving means used is preferably as follows:—The mid portion of the frame 7 preferably depends and is constructed to accommodate a shaft 28 journaled in said depending portion of the frame, as clearly shown in Fig. 4. Intermediate the ends of said shaft is secured a sprocket 29 adapted to be driven from any suitable source of power by means of a chain as diagrammatically represented at 30 in Fig. 2. Rigidly secured to one extremity of said shaft is a pinion 31 which meshes with the gears 32 preferably formed directly on two of the flanges of two of the corresponding wheels of each truck. In order to prevent the axles from turning in a horizontal plane and thereby unmeshing or binding the pinion 31 and the gears 32, the tie-rods 33 are provided which are secured to the front and rear axles in any convenient manner, as by means of the collars 34 slipped over the extremities of the axles and prevented from working off the same by means of the insertion of suitable retaining pins or cotter pins through the holes 35 properly positioned in the extremities of the front and rear axles. The tie-rods 33 are inserted through said collars 34 and held in place by the nuts 36 screwed on the threaded extremities 37 of the tie-rods. By this construction, the axles are free to turn within the collars, but the tie-rods prevent any relative movement of the two axles in a horizontal plane.

The top of the framework may be constructed to suit different requirements, since the type of the machine body supported on said frame 7 will slightly alter the circumstances and it may be desirable to support said machine body on the framework 7 in various ways. Where it is desirable to allow the truck to support its share of the weight of the machine body at a central point, a center bearing socket 38 is provided in which fits a suitable center bearing carried by the machine body. As said center bearing will have a ball-shaped extremity to coöperate with the center bearing socket 38, it is obvious that the truck can tilt bodily out of the horizontal plane without imparting motion to the machine body.

By locating the sprocket 29 at the center of the truck, it is apparent that the pull of the sprocket chain will not tend to prevent the truck from swiveling as the machine makes a curve. The feature of transmitting the motion directly to the flanges of two wheels of the truck insures a compact construction wherein the drive is direct and transmitted throughout by good, substantial parts. In most cases, it is usually desirable to apply the driving force to only the two rear trucks and consequently, the front trucks used in such a construction need not be provided with the various driving elements hereinbefore described. The type of truck described is preferably used to support the rear of the machine body, the front trucks being identical therewith, except for the omission of the toothed flanges on the wheels and the driving mechanism.

Such a truck with the omission of the driving mechanism is within the scope of the invention if its supporting frame is mounted upon the axles of the wheels, as defined by the claims.

What I claim is:—

1. A truck of the class described comprising front and rear axles, a supporting frame mounted at three points directly on said axles, bearing boxes associated with the frame at the points of support of said frame, bearing blocks in said boxes, and bearing caps encircling the under side of the axle beneath said bearing blocks and secured to said frame.

2. A truck for large portable machines comprising front and rear axles, a supporting frame in which one axle is journaled at two points in the length of said axle and in which the second axle is journaled at a point intermediate the ends of the axle, and a center bearing socket on said supporting frame to be engaged by a suitable bearing on the machine body.

3. A truck of the class described comprising front and rear axles, traction wheels carried thereby, a supporting frame supported at three points directly on said axles, a shaft journaled in said supporting frame, a sprocket secured to said shaft and located centrally of the truck, and driving connections between said shaft and said traction wheels.

4. A truck of the class described comprising front and rear axles, traction wheels carried thereby, a supporting frame supported at three points directly on said axles, a shaft journaled in said supporting frame, a sprocket secured to said shaft and located centrally of the truck, a pinion secured to one end of said shaft, the two traction wheels adjacent said pinion having relatively wide flanges, said flanges being toothed and meshing with said pinion.

5. A truck of the kind described comprising front and rear axles, traction wheels secured thereto, relatively wide flanges on two of said wheels, said flanges being toothed, a supporting frame mounted at three points directly on said axles, a shaft journaled in said frame, a sprocket secured to said shaft located centrally of the truck, a pinion on said shaft meshing with said toothed flanges, and means to prevent said axles from turning relatively to each other in a horizontal plane.

In testimony whereof I affix my signature, in presence of two witnesses.

WALTER FERRIS.

Witnesses:
H. B. HAYDEN,
L. A. BRONSON.